US009027966B2

(12) United States Patent
Altmann et al.

(10) Patent No.: US 9,027,966 B2
(45) Date of Patent: May 12, 2015

(54) FITTING FOR A PIPE

(75) Inventors: Maik Altmann, Zeil Am Main (DE);
Rainer Dittmar,
Uechtelhausen/Weipoltshausen (DE);
Mika Savolainen, Lahti (FI)

(73) Assignee: Uponor Innovation Ab, Virsbo (SE)

( * ) Notice: Subject to any disclaimer, the term of this patent is extended or adjusted under 35 U.S.C. 154(b) by 796 days.

(21) Appl. No.: 12/969,120

(22) Filed: Dec. 15, 2010

(65) Prior Publication Data
US 2011/0163531 A1 Jul. 7, 2011

(30) Foreign Application Priority Data

Dec. 16, 2009 (DE) ..................... 20 2009 016 975 U

(51) Int. Cl.
*F16L 33/00* (2006.01)
*F16L 13/14* (2006.01)

(52) U.S. Cl.
CPC .................................. *F16L 13/143* (2013.01)

(58) Field of Classification Search
CPC ...................................................... F16L 13/143
USPC ......... 285/242, 256, 257, 259, 382, 397, 398,
285/417, 239, 123.4, 124.3, 123.1, 123.2,
285/123.3, 334.2, 53, 46, 47, 123.9,
285/123.15; 29/508; 403/292, 298, 375,
403/332, 336, 252, 335; 52/848;
138/112–114
See application file for complete search history.

(56) References Cited

U.S. PATENT DOCUMENTS

| 2,476,586 | A | * | 7/1949 | Darash .......................... 411/519 |
| 4,610,466 | A | * | 9/1986 | Geer et al. ...................... 285/12 |
| 5,207,460 | A | * | 5/1993 | Oetiker ......................... 285/258 |
| 5,984,376 | A | * | 11/1999 | Lampe .......................... 285/256 |
| 6,581,983 | B1 | | 6/2003 | Viegener |
| 2004/0247386 | A1 | * | 12/2004 | Sugiyama et al. ......... 403/408.1 |
| 2008/0173578 | A1 | * | 7/2008 | McKenzie .................... 210/232 |

FOREIGN PATENT DOCUMENTS

| DE | 29515269 | | 1/1996 |
| DE | 29701223 | | 6/1997 |
| DE | 29814222 | | 5/1999 |
| DE | 10217824 | | 7/2003 |
| DE | 10217829 | | 10/2003 |
| EP | 0611911 | | 1/1994 |
| EP | 582543 | A1 * | 2/1994 |
| EP | 0713042 | | 5/1996 |

(Continued)

Primary Examiner — Daniel P Stodola
Assistant Examiner — Jay R Ripley
(74) Attorney, Agent, or Firm — Occhiuti & Rohlicek LLP

(57) ABSTRACT

A fitting, particularly for connecting two pipes, comprising: a support sleeve (1), having a first connection segment (11*a*) at a first end, and having a second connection segment at an opposite second end, wherein at least the first connection segment (11*a*) is formed so that a pipe segment (70) can be pushed onto it and having a middle segment (12) disposed between the first and the second connection segment (11*a*, 11*b*), wherein the middle segment (12) comprises a fixing element (32, 34) extending at least partially around the support sleeve and having a separable ring element (20) having an inner diameter substantially corresponding to an outer diameter of the middle segment (12) and designed for being placed on the support sleeve (1) and being retained by the fixing element (32, 34) in the middle segment (12) in a fixed position.

21 Claims, 8 Drawing Sheets

(56) References Cited

FOREIGN PATENT DOCUMENTS

| | | |
|---|---|---|
| EP | 0774611 | 5/1997 |
| EP | 1251304 | 10/2002 |
| EP | 1265018 | 12/2002 |
| EP | 1265019 | 12/2002 |
| EP | 1278001 | 1/2003 |
| EP | 1412668 | 4/2004 |
| EP | 1441165 | 7/2004 |
| EP | 1486713 | 12/2004 |
| EP | 1775507 | 4/2007 |
| EP | 1775508 | 4/2007 |
| EP | 1930640 | 6/2008 |
| WO | 98/05897 | 2/1998 |
| WO | 03/052311 | 6/2003 |
| WO | 03/064912 | 8/2003 |
| WO | 2005/066533 | 6/2005 |

* cited by examiner

FITTING FOR A PIPE

CROSS-REFERENCE TO RELATED APPLICATIONS

This application claims the priority of German Patent Application No. 202009016975.8 filed on Dec. 16, 2009, the contents of which are hereby incorporated by reference in its entirety.

The invention relates to a fitting for a pipe, particularly for connecting two pipes, which can be plastic pipes.

BACKGROUND

Fittings for connecting pipes made of a metal-plastic combination, or having walls comprising plastic material, are known in many embodiments. The fitting bodies of the fittings known in this context are often made of metal, which is preferred for its strength. A fitting made of plastic is preferred if a high level of corrosion resistance is needed. Sliding the fitting onto the pipe and then retaining the fitting by pressing on a compression sleeve or by applying a compression force generated in another manner, is also known.

Prepared metal pipe cylinders are machined in a plurality of process steps for producing such fittings, in order to form a fitting having two connection segments, each for a pipe. For this purpose, often a more or less large quantity of material is machined off of the prepared pipe cylinder or a bar, in order to generate depressions and grooves.

Such a fitting is known, for example, from EP 1 930 64 0 A or DE 20 2005 016258 U1 or DE 10 2005 000720 A1. Production of such fittings, however, sometimes causes high material loss because a large amount of material must be removed or machined off, because the semi-finished parts are present in standardized cross sections, in order to obtain the symmetrically centered intermediate part.

SUMMARY

The object of the invention is thus to specify a fitting in which the material loss is reduced and the entire functionality of a fitting remains intact.

Said requirement is met by the subject matter of the independent claim 1. Embodiments and further developments of the invention are found in the sub-claims.

The object is achieved by proposing a fitting, particularly for connecting two pipes, comprising a support sleeve having a first connection segment at a first end and a second connection segment at a second, opposite end. At least one connection segment of the support sleeve is formed such that a pipe segment of a pipe, particularly a plastic or metal composite pipe, can be placed onto the connection segment. The support sleeve further comprises a middle segment that can be disposed substantially symmetrically or asymmetrically between the first and the second connection segment. Said middle segment comprises a fixing element at least partially extending around the support sleeve, for retaining a ring element.

A separable ring element having an inner diameter substantially corresponding to an outer diameter of the middle segment is further provided for the fitting according to the invention. The separable ring element is implemented for sliding along an end of the support sleeve and flanging, and for being retained by the fixing element in the middle segment in a fixed position A fitting and separable ring element are thereby provided according to the invention. The fitting, particularly a metal fitting, is thus no longer produced from a single piece having a protruding middle segment, rather from two separately produced elements, namely a support sleeve and a separate ring element that is flanged for provided the fitting on the support sleeve and is held in a fixed position.

The separation thus made significantly reduces the material loss of a metal fitting during production, because a thinner-walled pipe or a thinner bar is sufficient for producing the support sleeve, and a large amount of material no long needs to be removed from the pipe for forming the center protruding segment. Rather, according to the invention, a fixing element is produced in the middle segment of a support sleeve, serving to retain a separable ring element in the middle segment in a fixed position.

If the support sleeve is made of a plastic or a metal-plastic composite, the production is simplified, particularly an injection molding process, because stresses in the plastic are reduced by producing a more uniform diameter during injection molding. Separately producing the plastic support sleeve and separable ring element thus reduces stresses in the support sleeve that can arise when producing a single workpiece.

For further material savings, the ring element can be made of a different material than the fitting. For example, the fitting can be made of metal or a metal alloy, or a metal-plastic composite or plastic, while the separable ring element is formed of a plastic or metal. By flanging and attaching the separable ring element to the middle segment of the support sleeve, the functionality of the raised area thus produced and of the separable ring is nevertheless entirely retained.

In addition to a fitting for connecting two pipes, the fitting can comprise a different connection at the first connection segment thereof, for example a thread, a screw connection, an adapter to a different diameter, or the like. In addition to a simple support sleeve having two opposite openings, a tee piece or a star connection having such a separable ring element can be equipped.

In one embodiment of the invention, the separable ring element can comprise a color code and, for example, be of a different color than the fitting. Further information can also be printed on or otherwise applied to the ring element. In this manner, various information can be communicated to a user or installer by means of the color of the separable ring element. For example, the color can indicate whether the fitting is used for a supply or a return line. Indication of a cold or hot water line can also be generated by an appropriate color code of the separable ring element. Additional printable information includes the time of manufacture or installation of the fitting, or the fluid flowing through the fitting.

By implementing the fitting as a ring element and a separate support sleeve, great flexibility can be achieved in this respect. During installation, for example at a construction site, the installer is able to select a suitable ring element in order to generate the required information by means of color coding, printing, or even a geometric code, such as by different geometric embodiments of the ring. By fixing the ring element in the middle segment, information about symmetry is simultaneously communicated to a user or installer, such as may be advantageous during installation and fitting of the various pipe segments on the support sleeve. If needed, the separable ring element can also be removed again.

In one embodiment of the invention, the fixing element on the support sleeve comprises a clip. The clip is configured, for example, as two opposite raised areas having a pocket between them. The separable ring element is guided over one of the raised areas into the segment between them, and attached in the middle segment in this manner. Said segment can comprise and outer diameter that is equal to or slightly larger than the outer diameter of the support sleeve in the connection segments, so that the ring element can be attached without much difficulty.

The mounting elements can extend around the support sleeve in segments, or alternatively be disposed completely around the circumference of the support sleeve. In one embodiment of the invention, the raised areas forming the clip are symmetric with regard to the height and design thereof. In a further embodiment, they are asymmetrical. For example, one of the mounting elements is somewhat smaller or flatter, thereby indicating the attachment direction of the separable ring element to an installer. The separable ring element can be particularly simply slid on to one end of the support sleeve adjacent to the lower sleeve. Alternatively, the elements disposed on both sides and acting as a clip can have different designs. For example, one element can extend around the support sleeve, while the second extends around the sleeve in segments.

In a further embodiment, additional recesses in the connecting segments are designed for receiving rubber rings. The rubber rings can be disposed in the recess before the separable ring element is slid on. The separable ring element can be implemented in the form of a circumferential ring, but also comprise additional elements on both sides. The cross section thereof can be square, rectangular, or polygonal, but can also comprise other shapes. For example, it can be implemented in the shape of an "I", so that it comprises slight depressions in a middle region.

In a further embodiment, the separable ring element comprises ring segments that can be plugged together. The ring segment can thus comprise a retaining clip at one end having a protrusion engaging with a retaining clip having a depression of a further ring segment. In a further embodiment, the separable ring element comprises a slit ring, the opening angle thereof being greater than 0° and less than 180°.

The slit ring can comprise a predetermined bending point, so that the slit ring forms a closed ring by means of clip elements applied to the slot for pushing together.

In one embodiment, the fitting is implemented as a press or clamping fitting having additional press or clamping sleeves. In said embodiment, each of the press sleeves or clamp sleeves do not touch or contact the separable ring element itself. Rather, a distance is provided between the clamp or press sleeve, and is still present after compression or clamping.

In order to position and assemble a clamp or press sleeve, in one embodiment, at least one additional recess is disposed between the connection segments at the end of the support sleeve and the middle segment of the support sleeve. A tab of the press or clamp sleeve engages in the support sleeve, and is retained there without contacting the ring element.

In this context, the separable ring element can also comprise an enlarged part in the outer region thereof, that is, the region further from the support sleeve. Said enlarged part can, for example, be disposed above the press or clamp sleeve, so that the enlarged part partially covers the clamp or press sleeve. The clamp or press sleeve is thereby protected against contaminants or damage, even after compression.

In another embodiment of the invention, the press or clamp sleeves form part of separable ring element. In this case, they are slid onto the support sleeve together with the separable ring element during the production of the fitting, and held in the fixed position in the middle segment. The clamp or press sleeve is connected to the ring element, for example by means of webs. Said webs can be broken during compression, so that no connection exists between the ring and the compressed sleeve anymore after compression.

DESCRIPTION OF THE DRAWINGS

The invention is explained in detail below, using various embodiments and referencing the drawings. They show:

FIG. 1 a first embodiment example of a fitting according to the invention, without a ring element attached, FIG. 2 an embodiment of a fitting according to the invention having a support sleeve and separable ring element slid on, FIG. 3 a cross-sectional view of a fitting according to the invention, FIG. 4 a cross-sectional view of a further embodiment of a fitting having a ring element attached, FIG. 5 a further embodiment of a fitting according to the invention, shown in a cross-sectional view, FIG. 6 a cross-sectional view of a further embodiment of a fitting according to the invention, FIG. 7 a view of a half ring that can be plugged together as a ring element for a fitting according to one embodiment, FIG. 8 a view of a ring element made of two half rings that can be plugged together for fitting according to one embodiment, FIG. 9 an embodiment of a fitting according to the invention having a support sleeve and separable slit ring element slid on.

DETAILED DESCRIPTION

The following different embodiments relate to a fitting for connecting two pipe elements, for example plastic or plastic-metal composite pipes. The fittings themselves can be made of metal, plastic, or a combination of metal and plastic, for example a metal-plastic composite pipe. The aspects shown in the depicted forms can be arbitrarily combined with each other for the different embodiments, without affecting the basic idea of the invention of providing a fitting having a support sleeve and a ring element separable therefrom. A fitting having a press sleeve is shown in some embodiments. The basic principle, however, is not limited to press sleeves, rather, it can be applied for any type of fittings, including fittings suitable for press sleeves, clamp sleeves, or other attaching elements by means of which pipes are retained at the support sleeve.

Figure 1:
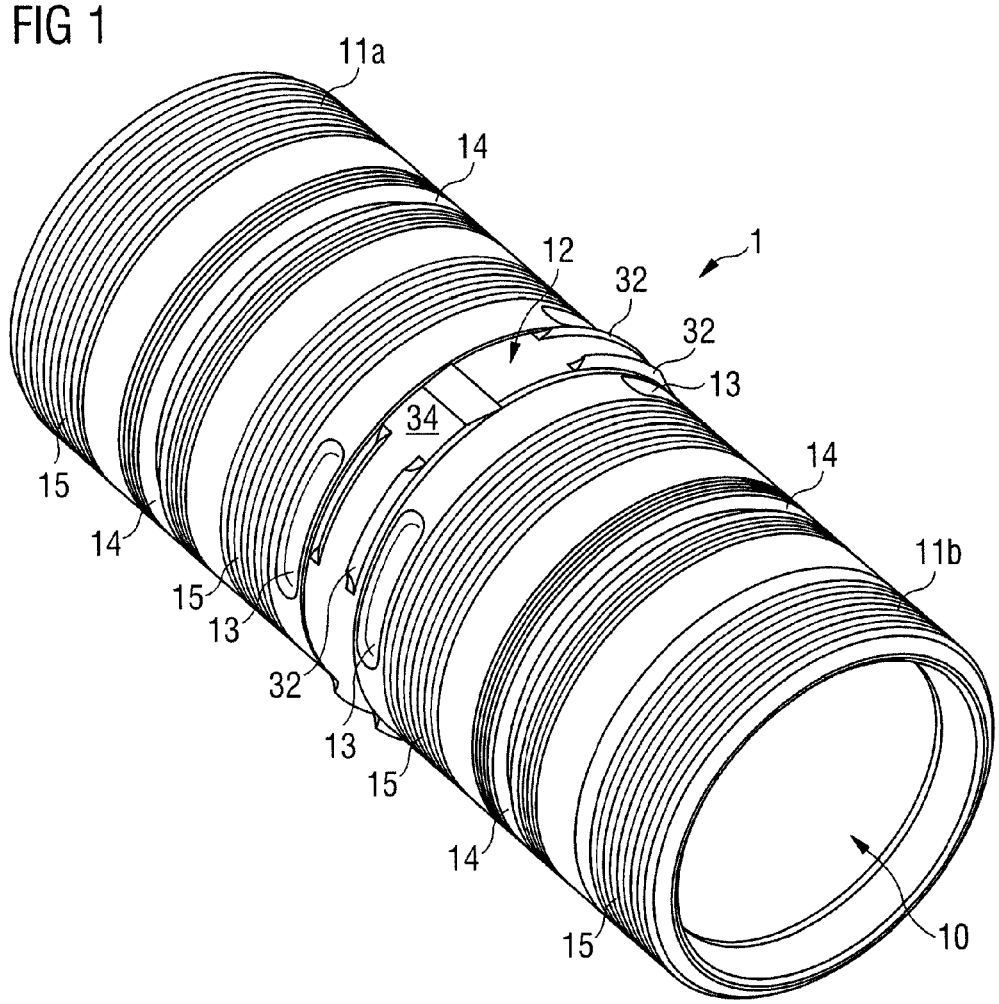

FIG. 1 shows a support sleeve of a fitting according to the invention made of metal, such as copper, brass, or an alloy. A plastic support sleeve is, of course, also conceivable. For producing the support sleeve shown, a pipe is machined in that various grooves and recesses are milled, turned, or otherwise formed in the pipe. In contrast to previous fittings, however, there is no or only a slightly protruding center segment in the fitting according to the invention having the support sleeve shown, so that a semi-finished material having a reduced cross section relative to conventional fittings can be used for producing the support sleeve shown. Significantly less material is removed accordingly for producing the support sleeve shown, so that the overall material usage is reduced. In addition to a pipe, a commercially available semi-finished product, such as a bar having a cylindrical or polygonal cross section, can be used.

The support sleeve 1 comprises a first segment 11*a* and a second segment 11*b* slightly rounded at the end thereof. Both segments 11*a* and 11*b* are symmetrically constructed in the represented form. A fluid or a gas can travel through the support sleeve through the opening 10.

The end segments 11*a* and 11*b* are connected to each other by a middle segment 12. The middle segment is disposed symmetrically and centered relative to the support sleeve 1.

The segment 11a and 11b comprise a total of three identical circumferential grooves or recesses 15, implemented having a slight sawtooth shape, adjacent to the ends thereof. In other fitting diameters, a different number of grooves, but at least one groove, can be turned or machined, depending on the diameter. A further recess 14 is provided at a distance therefrom, the depth thereof being significantly deeper than the circumferential grooves 15. The recess 14 serves, for example, for receiving a rubber ring, by means of which a tight seal is ensured after a plastic or plastic-metal composite pipe is pushed onto the fitting. Adjacent thereto in the direction toward the middle segment 12 is a further slight recess, in which a plastic ring can also be inserted. Further circumferential grooves 15 are then disposed in both segments 11a and 11b. The grooves 15 in the segments are less deep than the recess 14 and serve, for example, for receiving material of the pipe that builds up in the grooves 15 after pushing on and subsequently compressing the pipe, and thus contribute to additional strength and seal tightness of the press or clamp connection. The sawtooth shape of the grooves 15 prevents the pipe slid onto the support sleeve from easily sliding off.

Further periodically recessed partial segments 13 are disposed directly adjacent to the middle segment 12. Said segments are not circumferential; rather, they are implemented as trench-shaped recesses adjacent to the middle segment 12 in regular segments. They serve for receiving a mounting element of a press or clamp sleeve, not shown here, that is pushed onto the press fitting. The pipe to be connected is then slid in between the press or clamp sleeve, and the compression is performed.

The middle segment 12 in turn comprises a slightly raised area 34 and a plurality of partial segments implemented as clips, each having two adjacent retaining elements 32 as raised areas. The raised areas 32 represent a fixing element in the form of a clip, between which the separable ring element that will be disposed later is fixed. The region 34 in which the clips having the elements 32 are disposed is also slightly raised, that is, it has a slightly larger diameter than the outer diameter of the further segments 11a and 11b, for example. The middle segment is slightly recessed between the segments 34.

Figure 3:
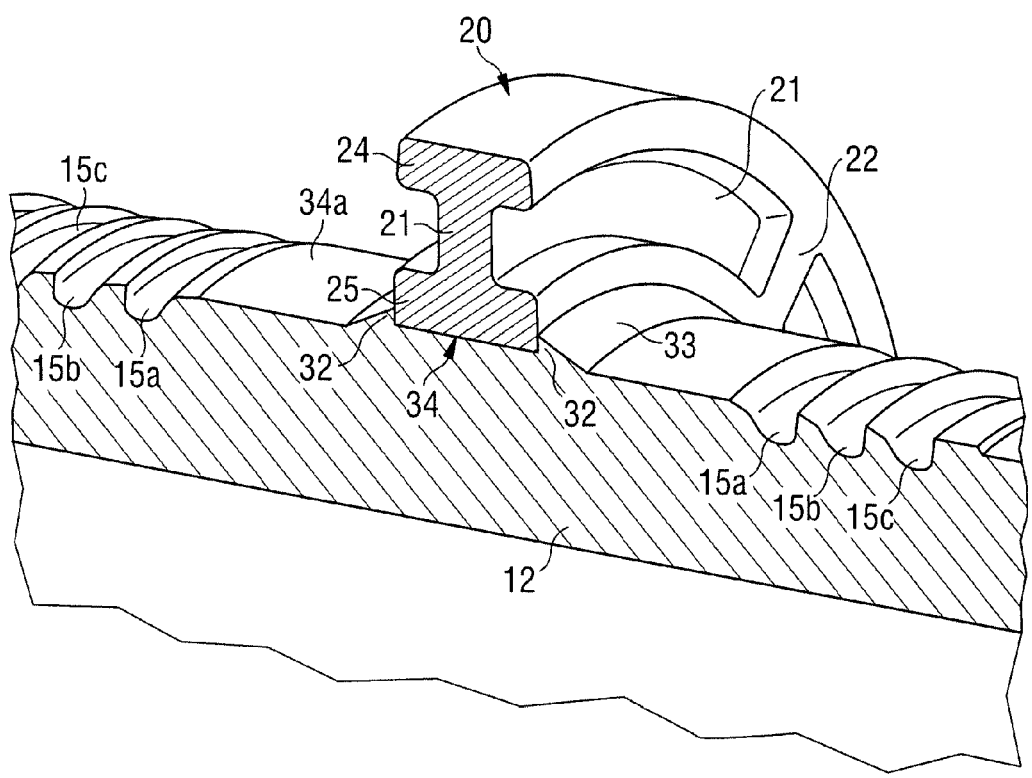

FIG. 3 shows a detailed cross-sectional view, in this respect, of the fitting according to the invention, having the middle segment 12 of a support sleeve 1 and a separable ring element pushed on. The middle segment 12 comprises the two raised areas 32 implemented as clips, the outer surface thereof flattening and rising in the direction toward the center of the support sleeve 12. The two raised areas 32 thus form a type of triangle having a steeply dropping side flank, between which the separable ring element 20 is disposed in the area 34. The area 34 disposed between the raised areas 32 acting as clips is disposed slightly above the outer surface 34e of the support sleeve in the present embodiment. In other words, the outer diameter in the region 34a of the support sleeve is slightly less than in the region 34 of the middle segment 12. The ring element can thereby be easily slid over the outer segments 11a and 11b onto the support sleeve.

The separable ring element itself has the shape of an I, having a lower retaining region 25, the width thereof being substantially the distance between the two raised areas 32 forming a clip. A middle segment 21 having a significantly smaller cross section is adjacent to the retaining region 25, to which an upper region 24 connects. Said region substantially corresponds to the width of the retaining region 25 and is also connected to the same by struts 22. Letters are printed on the upper outer surface of the region 24 in order to provide information to a user or installer. The recess resulting from the middle segment 21, serves for at least partially receiving a press or clamp sleeve. The clamp or press sleeve nevertheless does not contact the separable ring, rather, a slight distance remains between said ring and the press or clamp sleeve. Said distance can be, for example, the width of the raised area 32.

In said embodiment, the separable ring element 20 and the support sleeve 1 are made of different materials. The separable ring element is made of a plastic and is more easily compressible that the support sleeve made of metal, so that it can be slid over one of the raised areas 32 in the middle segment 12 and retained in the region 34 in a fixed position.

The further groove-shaped recesses 15a, 15b, and 15c on each side of the middle segment 12 are substantially semicircular in design. At each end facing toward the middle segment, the surface is slightly diagonally tapered. A type of sawtooth retainer is thus formed, so that a pipe can be simply pushed onto the support sleeve, but pulling back the pipe is simultaneously made more difficult.

Figure 2:
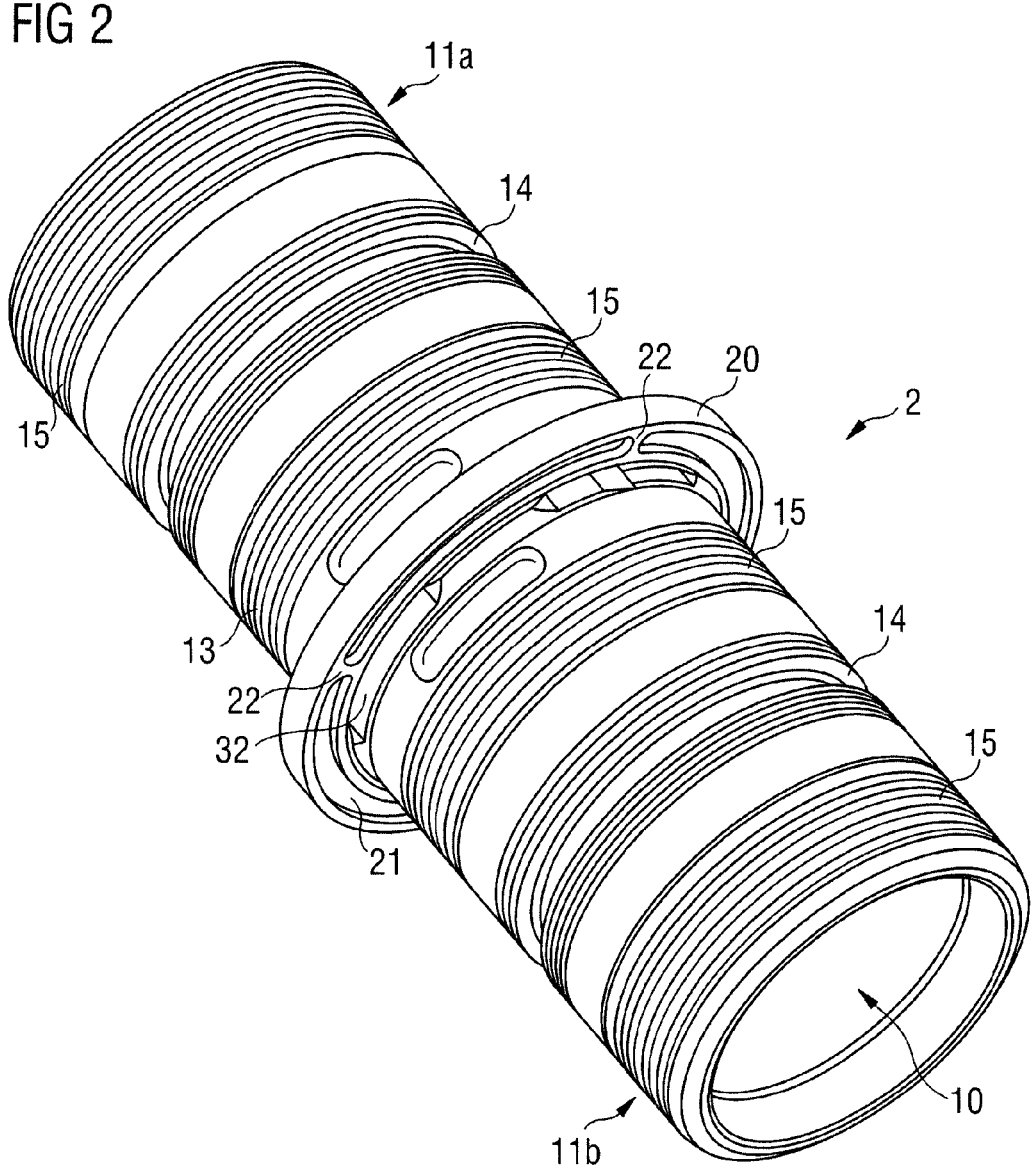

FIG. 2 shows the embodiment of a fitting 2 according to the invention, having a separable ring element gushed on. The same features relative to the embodiment of the support sleeve in FIG. 1 have the same reference numeral.

The ring 20 is fixed at its position in the middle segment by the raised areas 32 acting as a clip and disposed on both sides of the middle segment 12. The middle segment 12 is slightly recessed between the segments 34 having the retaining elements 32. The inner side of the ring element thus contacts the support sleeve only in the regions 34 and is partially exposed between the retaining elements. Said configuration makes installation of the ring element easier during production of the fitting. It is also possible, of course, that the inner side of the ring element is in contact with the middle segment of the support sleeve along the entire circumference thereof.

The recesses 13 next to the middle segment 12 are disposed slightly offset relative to the raised areas 32 acting as clips. Depending on the embodiment, the recesses 13 can also be provided as gaps for the raised areas 32. The recess 13 for retaining the press sleeve, or also at least one of the raised areas 32 acting as clips, can alternatively be implemented circumferentially about the support sleeve.

Figure 4:
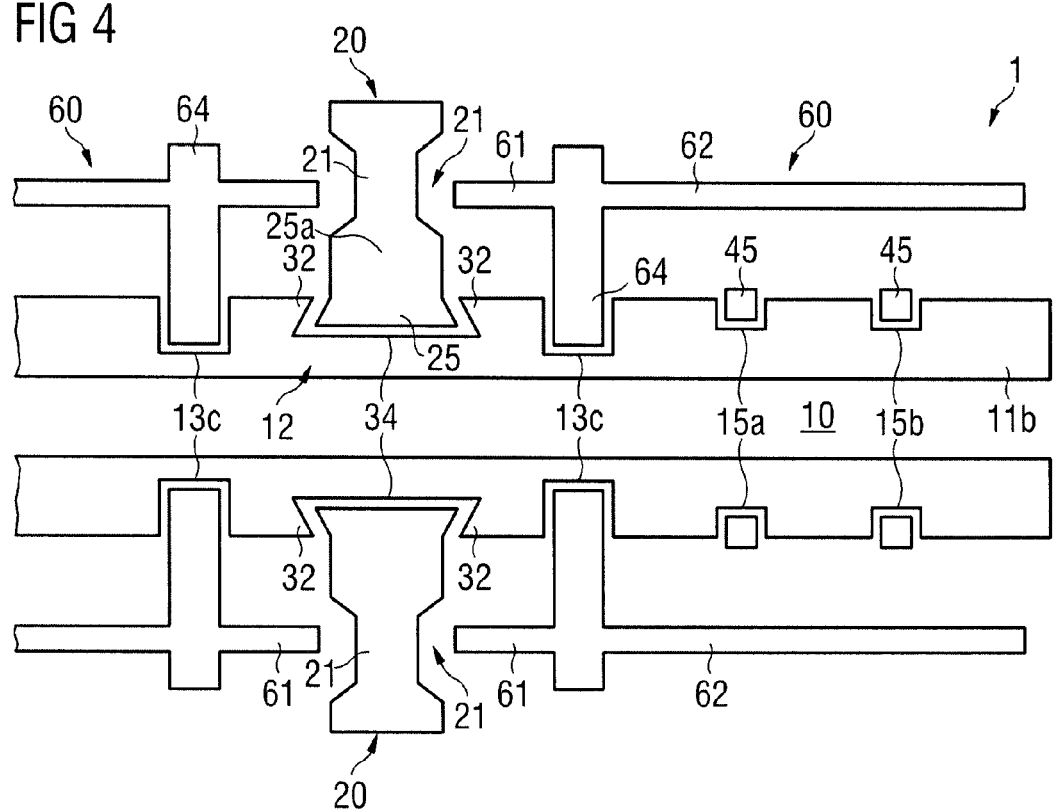

FIG. 4 shows a further embodiment of a fitting according to the invention, in a cross-sectional view. The fitting according to the invention comprises a support sleeve 1 having two outer connection segments, of which one 11b is explicitly shown here. The connection segment 11b is designed for a clamping sleeve and comprises a recess 13c extending about the support sleeve adjacent to a middle segment 12. Facing the outer opening of the connection segment 11b are two additional recesses 15a and 15b, in each of which a rubber seal 45 is disposed circumferentially. Said rubber seal is substantially rectangular in design, but can also be oval or round. The recesses 15a and 15b are implemented accordingly as rectangular recesses, but are less deep than the recesses 13c provided for the press sleeve 60. The press sleeve 60 comprises a press segment 62 disposed between the outer end of the connection segment 11b of the support sleeve and the recess 13c for retaining the press sleeve. It thus overlaps the two recesses 15a and 15b provided for the rubber rings 45. A pipe can be pushed in to the intermediate space thus formed, up to the retaining segment 64 of the press sleeve 60.

The retaining segment 64 is implemented slightly more narrow in said embodiment than the width of the recess 13c for retaining the press sleeve 60. The press sleeve thus has a slight clearance. A region 61 protruding slightly past the retaining segment 64 is provided for stabilizing the press sleeve. Said region is, however, so short that even if the press sleeve 60 is positioned at the left edge of the recess 13c, the circumferential separable ring element 20 does not contact the recess 21 thereof. In other word, a distance is further present between the circumferential separable ring element 20 and the press sleeve 60. The recess 13c somewhat wider than the retaining segment 64 allows simple installation of the press sleeve 60 and serves for compensating for production tolerances between the retaining segment 64 of the press sleeve 60 and the support sleeve 11b.

The middle segment 12 also comprises a recess 34, comprising a slightly expanding cross section starting from the outer surface of the support sleeve toward the inner region. The recess 34 is bounded by two slightly sloped edge elements 32, whose radius increases slightly with depth. The recesses are thus funnel-shaped, opening inward.

The depth of the recess in the middle segment 12 in said embodiment is selected to be less than the corresponding recess 13c for the retaining elements of the press sleeve 60. The lower region of the ring element 20 is simultaneously wider, so that is can be slid over the recesses 13c during installation and assembly of the fitting and then can be clamped and fixed in the recess 34 by means of the also slightly chamfered region in the retaining segment 25.

The separable ring element further comprises a segment 25a, tapering upward in the region 21, that is inserted into the funnel-shaped recess in the support sleeve. The region 25a is disposed at a distance from the support sleeve, in which the protruding segments 61 of the press sleeves 60 are also disposed. The upper region of the separable ring 20 is, in turn, wider in design and allows text to be applied to the surface thereof for providing information to an installer. It can also serve as a slight cover for the protruding segments 61 of the press sleeve after compression and completion of the fitting, so that an additional protection against dust or contamination is achieved in the region between the separable ring element and the retaining element 64 of the press sleeve 60. The separable ring segment can be formed of plastic for easy attachment within the recess 34, so that it can be snapped into the recess 34 and the chamfered surfaces 32 like a clip.

Figure 5:
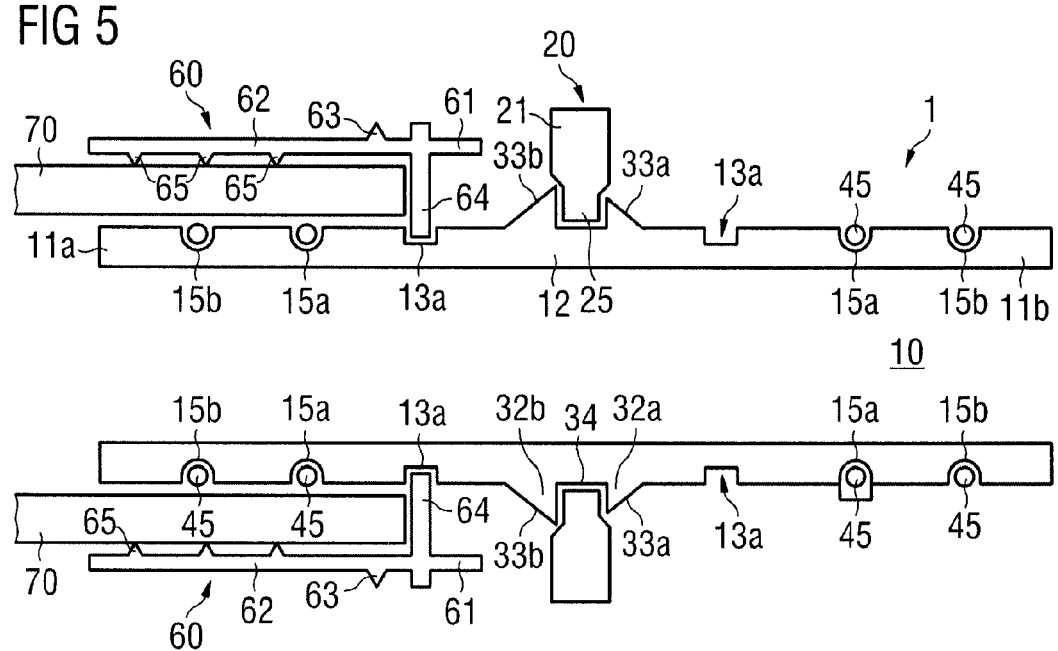

FIG. 5 shows a further embodiment of a fitting according to the invention. In said embodiment, a support sleeve having both connection segments 11a and 11b and a middle segment 12 is provided. Both connection segments in turn comprise the circumferential recesses 15a and 15b for receiving rubber seals 45. A further recess 13a is provided between the circumferential recesses 15a on both sides of the middle segment 12 and the middle segment 12 for receiving the retaining element 64 of a press sleeve 60. As shown, the left press sleeve in said embodiment is already attached to the fitting above the connection segment and the retaining segment 64 engages in the recess 13a. A pipe 70 is inserted into the intermediate space between the press segment 62 and in the connection segment 11a, the outer right end thereof contacts the retaining segment 64 of the press sleeve.

A plurality of small raised areas 65 are disposed at the bottom side of the press segment 62 of the press sleeve, engaging in the plastic pipe 70 during compression and bringing about additional fixation. Here, the raised areas 65 can extend along the inner side of the press segment 62 of the press sleeve 60, but also have a different shape. For example, a plurality of pointed raised areas 65 can be disposed on the inner side of the press segment 62. A guide element 63 is further provided on the outer surface of the press segment 62 near the retaining segment. Said guide element is implemented as a triangular circumferential raised area and serves for guiding a press tool having a correspondingly disposed chamfer, thus ensuring suitable compression.

In said embodiment, the middle segment 12 comprises two opposite mounting elements having raised areas 33a and 33b, between which the separable circumferential ring element 20 is disposed. The raised areas 33a and 33b are implemented as surfaces rising in the direction of the surface 34, wherein one of the retaining segments 33b comprises a greater pitch than the other, opposite retaining segment 33a. In other words, one side wall of the retaining element 33b is larger than a corresponding side wall of the retaining element 33a. The mounting elements are thereby flatter on one side of the fixing element than on the other side. The retaining segment 25 of the circumferential ring element 20 engages in the recess created by the two retaining segments 33a and 33b in the region 34, and is thereby fixed. Due to the different characteristic with respect to the slope and height of the two retaining segments 33a and 33b, the ring can be particularly simply slid onto the support pipe from the right during the production of the fitting according to the invention, and then latched into the recess 34 via the rising surface of the retaining element 33a.

The two retaining segments 33a and 33b extend around the entire circumference of the support sleeve 1 in said embodiment. Alternatively, the retaining segments 33a and 33b are implemented only in segments, for example, in the form of symmetrically disposed partial segments 33a and 33b. The outer diameter in the region 34 of the middle segment 12 is slightly greater in said embodiment than the corresponding outer diameter in the recesses 13a designed for receiving the retaining element 64 of the press sleeve 60. The width of said region 34, in turn, is greater than the corresponding recess 13a or 15a 15b, so that the ring can be guided over said recesses while being slid on and then latches into the middle segment 12 in the region 34.

In this context, the outer diameter in the retaining region 34 can be slightly greater than the outer diameter of the rest of the support sleeve, particularly in the connection segments 11a and 11b. This means that an inner diameter of a ring element 20 is also greater than the corresponding outer diameter in the connection segments 11a and 11b, whereby the separable ring can be particularly simply slid onto the support sleeve.

Figure 6:
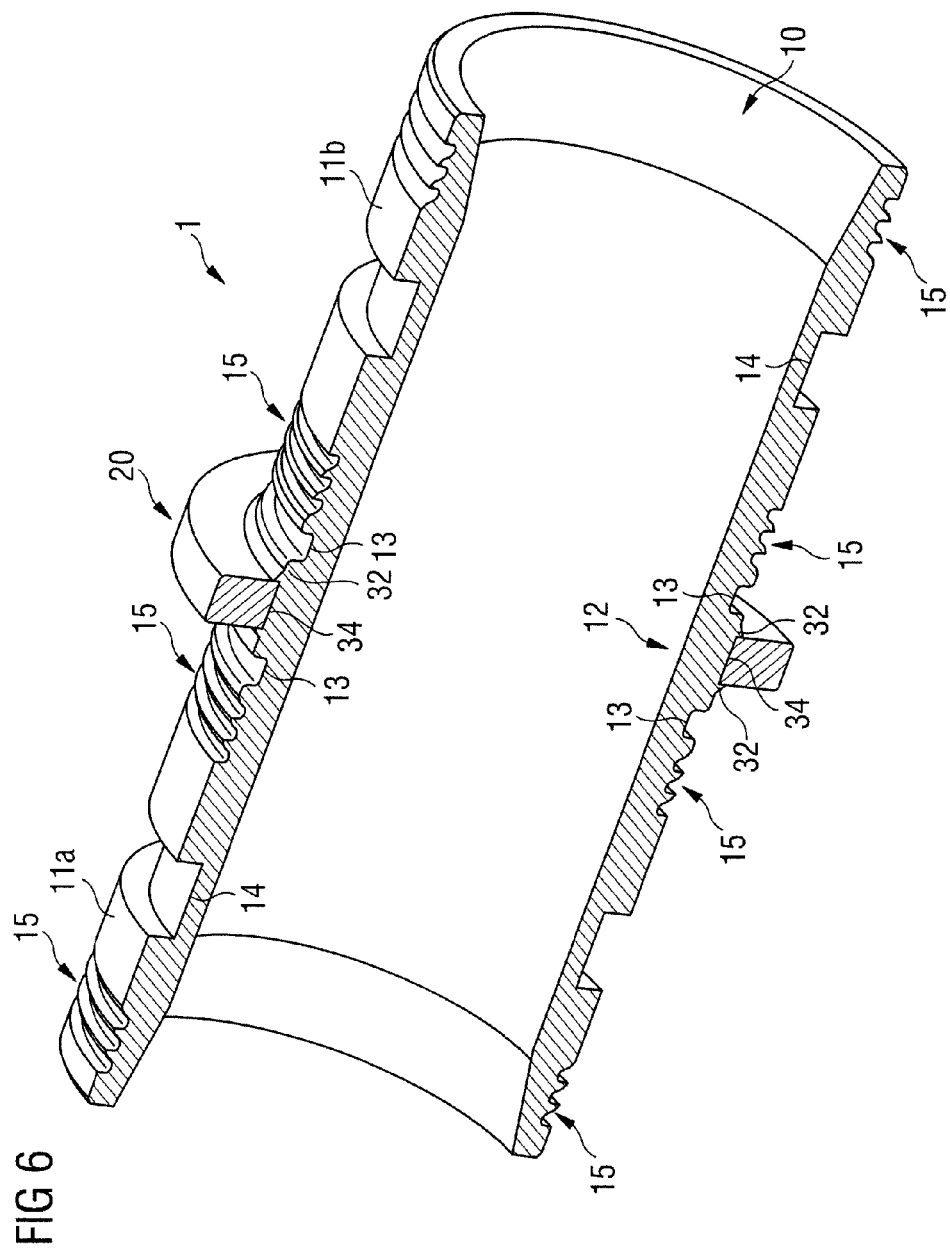

A further representation similar to the embodiment according to the FIGS. 1 through 3 is shown by FIG. 6. Elements that are the same as in FIGS. 1 through 3 have the same reference numerals, wherein the effect and function of the same is not explained again.

A flange ring 20 is disposed in the middle segment 12, retained by two circumferential fixing elements 32 in the position thereof in the segment 34. The outer diameter in the region of the segment 34 is slightly greater than the outer diameter in the region of the two outer segments 11a and 11b, such as between the recesses 15. The ring 20 can thereby be simply slid onto the support sleeve. The circumferential recesses 13 on either side of the middle segment 12 receive the mounting elements of the clamp or press sleeves.

Figure 7:
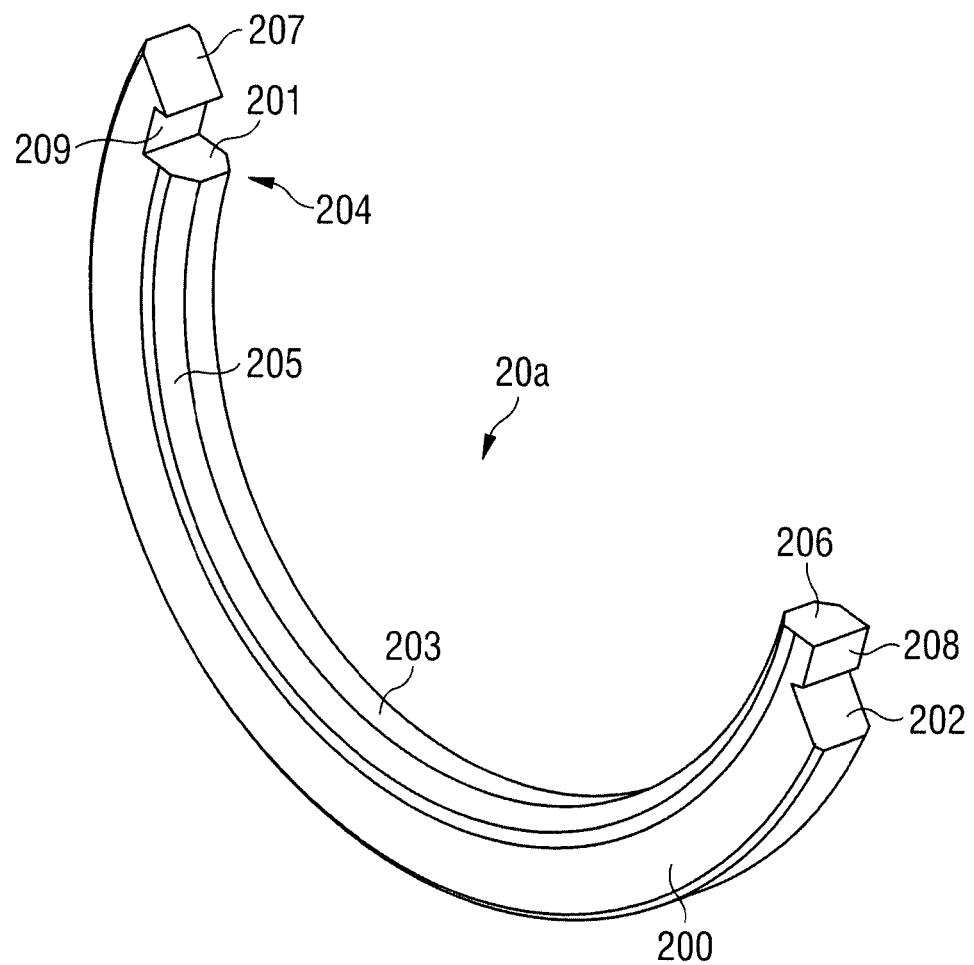

FIG. 7, finally, shows in turn a half ring 200, forming the separable ring element 20a together with a further counterpart. The body of the half ring 200 is slightly thinner on the inner side 203 thereof due to two diagonally flattened edges 205 and 206, so that it fits well in a mounting element of a support sleeve not shown here. At one end, it has a mounting element having a retaining clip 207 comprising a slight protrusion. Said protrusion fits in a mounting element 202 at the other end of the half ring 200. Said element has a recessed surface 209, a slight recess and a bevel adjacent thereto. The recess serves for receiving the protrusion at the end of a further half ring, so that the surface 208 is adjacent to a surface 209. A plurality of segments, not just those 2 depicted here, are thus clipped or pushed together in order to form such a ring.

Figure 8:
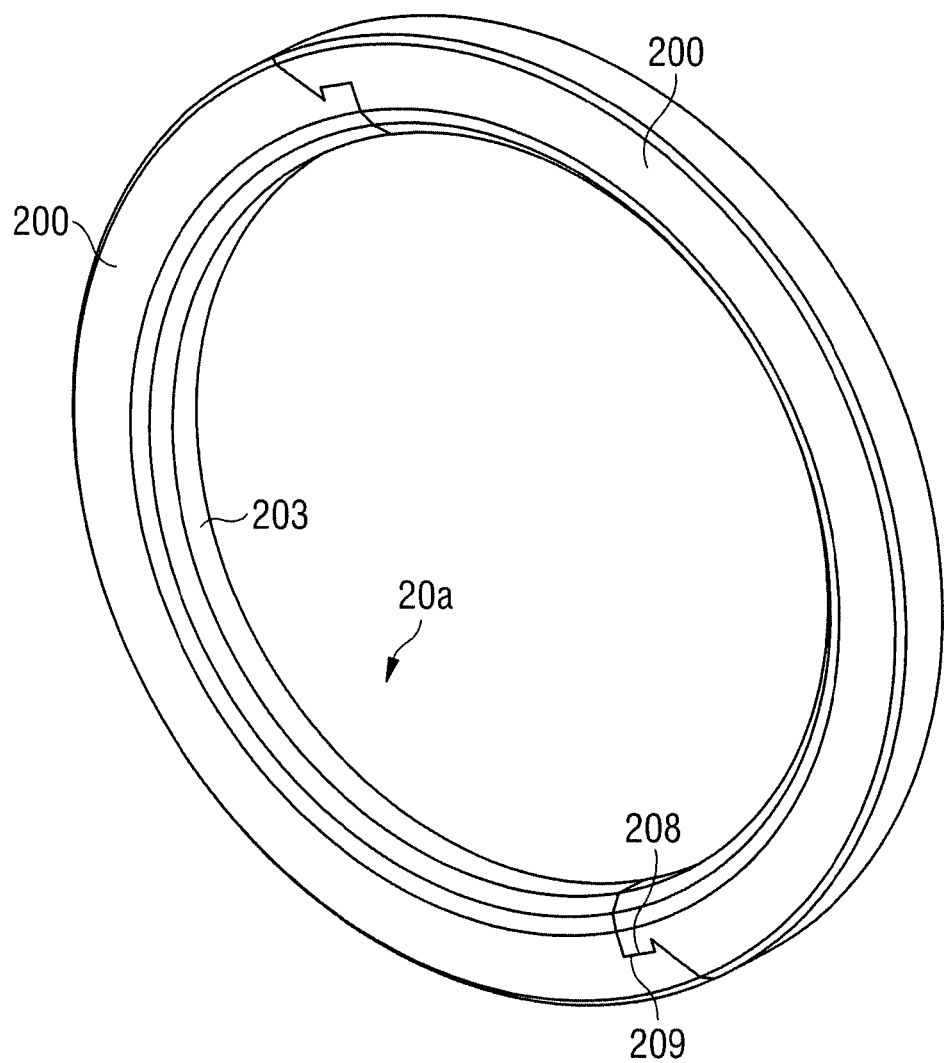

FIG. 8 shows a depiction of two such assembled half rings 200, together forming the separable ring element 20a. When assembling such a ring element, the two half ring parts are clipped to each other. The tabs act as retainers and prevent the two half rings 200 from falling apart. At the same time, mounting elements can be provided at the support sleeve in the middle segment, fixing the ring element 20a in its position.

Figure 9:
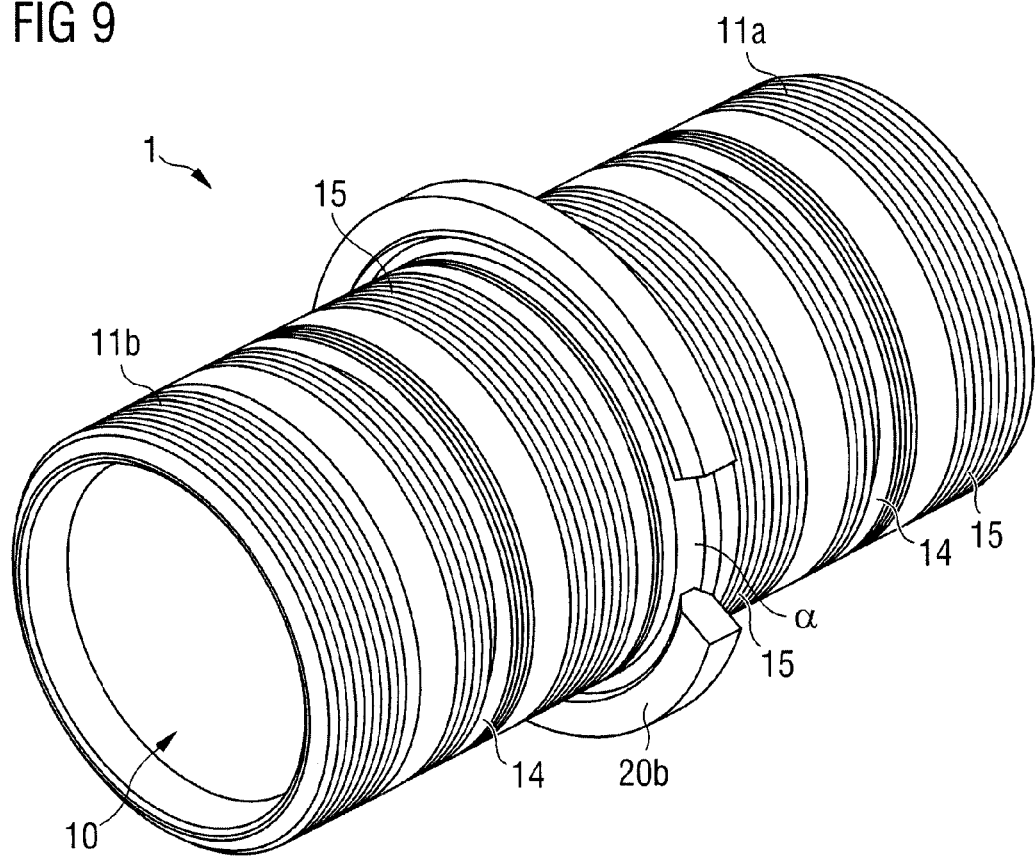

A further aspect is shown in FIG. 9. The separable ring element is implemented there as a slit ring 20b or as a ring segment 20b. A slit ring is a ring segment, whose circumference preferably comprises more than 180° but not 360°, thus not forming a completely closed ring. In other words, an opening angle of the ring segment is greater than 0°, but preferably less than or equal to 180°. The ring segment 20b shown in FIG. 9 has an opening angle a of about 20°. It is slightly bent open for installation, then slid onto the support sleeve along one end, to the middle segment. In said embodiment, the middle segment is formed without further mounting elements for fixing, wherein in other embodiments, of course, such mounting elements or also guide rails can be provided.

If the circumference of the ring segment is less, for example less than 270°, the ring segment can also be slipped directly onto the middle segment of the support sleeve.

In a further embodiment, a retaining clip is provided at each end of the ring segment, that is in the region of the slot. A predetermined bending point is further applied in the ring segment, so that the ring segment is slid over the support sleeve by means of the bending point, then pressed together, and finally put together at the opening by means of the retaining clips.

A fitting, particularly for connecting two pipes, is created by the invention, in which material usage during production, particularly of the support sleeve, is reduced. This reduction is attained by consistent separation and separate implementation of the support sleeve and a ring element that can be separated therefrom, forming a symmetrical middle segment. Both can be made of different materials, such as metal and plastic. The ring element, for example, can be made of plastic, whereas the support sleeve is made of metal, for example of copper. The ring element is slid onto the support sleeve and retained in a fixed position in the middle segment by means of a fixing element of the support sleeve. The embodiments shown here can be combined arbitrarily, without impairing the substantial idea of the invention. For example, pluggable half rings or ring segments can be used also with support sleeves having mounting elements in the middle segment or continuous rings with support sleeve without mounting elements in the middle segment. Simple fittings having connection ends for two pipes are used for simplifying the depiction. This principle of a fitting having a separable ring element can, of course, also be used for fittings having only one connection piece for a pipe and a threaded connection at the other end, for a tee piece, a distributor, or any other form of elements connecting pipes. The middle segment and the separable ring element do not need to be symmetrical relative to the fitting. An asymmetric arrangement is also possible.

REFERENCE LIST

1 Support sleeve
10 Opening
11a, 11b Connection segment
12 Middle segment
13, 13a Recesses for retaining segments of a press or clamp sleeve
15 Recesses for rubber seals
15a, 15b Recesses for rubber seals
20 Separable ring element
20a Half ring
20b Ring segment, slit ring
21 Ring element segment
25 Retaining segment of the ring element
32 Retaining element
33a, 33b Retaining element
34 Retaining segment
45 Rubber seals
60 Press sleeve
61 Press sleeve segment
62 Press segment
64 Retaining segment of the press sleeve
200 Half ring body
203 Inner side
205 Chamfered edge
204 End region
206, 207 Retaining clip
208, 209 Areas
α Opening angle

The invention claimed is:

1. A fitting, comprising:
   a support sleeve
      having a first connection segment at a first end, and
      having a second connection segment at an opposite second end, wherein at least the first connection segment is formed so that a pipe segment can be pushed onto it;
      having a middle segment disposed between the first and the second connection segment, wherein the middle segment comprises at least two mounting elements extending at least partially around the support sleeve,
         wherein the at last two mounting elements are arranged axially offset from each other and extend around the support sleeve at least in segments in the middle segment,
         wherein at least a first mounting element of the at least two mounting elements is implemented as a clip comprising as a first raised area, an outer surface of the first raised area flattening in a direction toward the first connection segment and rising in a direction toward the center of the support sleeve, such that a cross-section through the first mounting element forms a triangle having a steeply dropping side flank; and
   a separable ring element
      having an inner diameter substantially corresponding to an outer diameter of the middle segment and designed for being placed on the support sleeve and being arranged between and retained by the at least two mounting elements in the middle segment in a fixed position.

2. The fitting according to claim 1, wherein at least a second mounting element of the at least two mounting elements is implemented as a clip comprising as a second raised area, an outer surface of the second raised area flattening in a direction toward the second connection segment and rising in the direction toward the center of the support sleeve, such that a cross-section through the second mounting element forms a triangle having a steeply dropping side flank.

3. The fitting according to claim 2, wherein the first mounting elements is arranged on a first side of the separable ring element retained in the fixed position and the second mounting element is arranged on a second side opposite of the first side of the separable ring element retained in the fixed position, and an incline of the first raised area of the first mounting elements with respect to an axial direction of the support sleeve is flatter than or equal to an incline of the second raised area of the second mounting element.

4. The fitting according to claim 1, wherein the separable ring is arranged in a groove or channel formed in the outer surface of the middle segment.

5. The fitting according to claim 1, wherein a contact surface for the separable ring element in the middle segment comprises an outer diameter equal to or greater than an outer diameter of the support sleeve in the region of the connection segments.

6. The fitting according to claim 1, wherein recesses for receiving press or clamp sleeves are provided on both sides of the middle segment in the support sleeve.

7. The fitting according to claim 6, wherein a width of the recesses for a retaining element of the press or clamp sleeve is less than an axial distance between the at least two axially offset mounting element.

8. The fitting according to claim 6, wherein the recesses for receiving press or clamp sleeves are disposed at least partially offset relative to the mounting elements.

9. The fitting according to claim 6, further comprising a pushed-on press or clamp sleeve, wherein a distance between recesses for receiving the press or clamp sleeve and the mounting elements is selected such that a pushed-on press or clamp sleeve is offset from the ring element.

10. The fitting according to claim 1, wherein the separable ring element comprises ring segments that can be plugged together.

11. The fitting according to claim 10, wherein the ring segment comprises a retaining clip at one end having a protrusion engaging with a retaining clip having a recess of a further ring segment.

12. The fitting according to claim 1, wherein the separable ring element comprises a slit ring, the opening angle thereof being greater than 0° and less than 180°.

13. The fitting according to claim 1, further comprising a clamp or press sleeve slid onto one of the first connection segment and the second connection segment, wherein the ring element comprises an outer diameter greater than a diameter of the clamp or press sleeve.

14. The fitting according to claim 1, wherein the ring element comprises a different material than the support sleeve.

15. The fitting according to claim 1, wherein the support sleeve is made of a metal or a metal alloy or a plastic or a metal-plastic composite material.

16. The fitting according to claim 1, wherein the ring element is made of a metal or a plastic or a metal-plastic composite material.

17. The fitting according to claim 1, wherein the ring element comprises a softer material than the support sleeve in a segment adjacent to the inner diameter of the ring.

18. The fitting according to claim 1, wherein the ring element comprises a different color than the support sleeve.

19. The fitting according to claim 1, wherein written information is applied to an outer surface of the ring element.

20. The fitting according to claim 1, wherein the separable ring element comprises a retaining region for attaching to the mounting elements, and a second region adjacent thereto having a different thickness than the retaining region.

21. The fitting according to claim 1, wherein the separable ring element comprises the shape of an "I", having a retaining region for attaching to the mounting element, a middle region, and an outer region widened relative to the middle region.

* * * * *